(12) United States Patent
Alexander et al.

(10) Patent No.: US 8,487,837 B2
(45) Date of Patent: Jul. 16, 2013

(54) OPTICAL SIX-DEGREE OF FREEDOM TRACKING APPARATUS AND METHOD

(75) Inventors: William C. Alexander, Spicewood, TX (US); Daniel Gilbert, Austin, TX (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 1253 days.

(21) Appl. No.: 12/266,347

(22) Filed: Nov. 6, 2008

(65) Prior Publication Data

US 2010/0109976 A1    May 6, 2010

(51) Int. Cl.
*G09G 5/00* (2006.01)

(52) U.S. Cl.
USPC .................................. 345/8; 345/7; 359/630

(58) Field of Classification Search
USPC ... 345/156, 158, 7–9; 359/630, 632; 356/138, 356/152, 147; 701/1–18
See application file for complete search history.

(56) References Cited

U.S. PATENT DOCUMENTS

| | | | | |
|---|---|---|---|---|
| 3,678,283 A | * | 7/1972 | LaBaw | 250/216 |
| 3,917,412 A | * | 11/1975 | Stoutmeyer et al. | 356/141.5 |
| 5,326,052 A | * | 7/1994 | Krispin et al. | 244/135 A |
| 5,877,490 A | * | 3/1999 | Ramer et al. | 250/206.1 |
| 6,061,916 A | | 5/2000 | Stevens et al. | |
| 6,690,458 B2 | | 2/2004 | Schorr | |
| 7,046,215 B1 | * | 5/2006 | Bartlett | 345/8 |
| 7,965,277 B2 | * | 6/2011 | Ooi et al. | 345/163 |
| 2002/0033808 A1 | * | 3/2002 | Krulis | 345/204 |
| 2006/0256081 A1 | * | 11/2006 | Zalewski et al. | 345/156 |

OTHER PUBLICATIONS

Alexander, Bill. "Display Tracker." Technical White Paper, BAE Systems—Sensor Systems, Nov. 6, 2007.

\* cited by examiner

*Primary Examiner* — Koosha Sharifi-Tafreshi
(74) *Attorney, Agent, or Firm* — Locke Lord LLP; Daniel G. Nguyen (57) ABSTRACT

An optical tracking system, and method therefor, tracks the movement of an object, such as a pilot's helmet, within an enclosed area, such as a cockpit. The system/method comprises a plurality of light sources fixedly mounted in predefined locations within the enclosed area and a light sensor mounted on the object. Each light source is modulated using a different frequency from the other light sources to make that light source uniquely identifiable. Modulated light from the various light sources is converted by the sensor into an electrical signal. This composite signal is subsequently separated into individual signals based on their unique modulations, and the light source for each signal is identified. The signals are thereafter processed to determine an azimuth and an elevation for the line-of-sight to each light source. The azimuth and elevation information may then be used to determine the position and orientation of the object.

11 Claims, 6 Drawing Sheets

OPTICAL SIX-DEGREE OF FREEDOM TRACKING APPARATUS AND METHOD

CROSS REFERENCE TO RELATED APPLICATIONS

Not Applicable

STATEMENT ON FEDERALLY SPONSORED RESEARCH OR DEVELOPMENT

Not Applicable

TECHNICAL FIELD OF THE INVENTION

The disclosed embodiments relate generally to helmet tracking systems and, in particular, a helmet tracking apparatus and method that is capable of tracking the movement of a helmet in six degrees of freedom.

BACKGROUND OF THE INVENTION

Since the earliest days of aviation, particularly military aviation, pilots have preferred to look forward in the cockpit while flying. This preference led to the development of the head-up display (HUD), which presents information to the pilot without requiring him/her to look down or away. The HUD is essentially a transparent or semi-transparent display that allows the pilot to view, for example, navigational or weapons-aiming information, while looking straight ahead. More recently, helmet-mounted displays (HMD) have been developed that are mounted on the pilot's helmet directly in front of one or both of the pilot's eyes. The HMD is essentially a smaller HUD that allows the pilot to view the same navigational and/or weapons-aiming information as the HUD.

In order for any ground coordinated information to be presented to the pilot correctly, an HMD must be provided with the position and angle of the pilot's head. Thus, the HMD typically operates in conjunction with a helmet tracking system (HTS) that determines the position and angular orientation of the pilot's helmet with respect to a predefined reference, such as the aircraft axes. The helmet tracking system tracks the movement of the pilot's helmet in six degrees of freedom: X-axis, Y-axis, Z-axis, roll, pitch, and yaw. This tracking ensures that the information displayed on the HDM is correctly aligned in space and/or is precisely superimposed over external objects being viewed by the pilot.

It is important that helmet tracking systems be highly accurate and have fast dynamic response, particularly in armed forces applications, as a military pilot's head movements may be extremely rapid. However, the above criteria are often mutually exclusive so that existing helmet tracking systems tend to be a compromise between the two objectives. For example, inertial systems based on gyroscopes have a very fast dynamic response, but the accuracy of these systems is limited by drift over extended periods of operation. On the other hand, helmet tracking systems that are based on magnetic sensors are very accurate, but do not provide a fast enough dynamic response because of the slow settling times of the magnetic fields. Moreover, both inertial systems and magnetic systems tend to be relatively expensive due to the high cost of the complex components used in each system.

Accordingly, what is needed is a helmet tracking system that overcomes the deficits and shortcoming of existing systems.

SUMMARY OF THE INVENTION

Embodiments of the invention provide an optical tracking system, and method therefor, that is capable of tracking the movement of an object within an enclosed area. The system and method comprise a plurality of light sources that are fixedly mounted in predefined locations within the enclosed area and a light sensor mounted on the object. Each light source is modulated using a different frequency from the other light sources to make the light from that light source uniquely identifiable. In operation, modulated light from the various light sources is received by the sensor and converted to an electrical signal. This composite signal is subsequently separated into individual signals based on their unique modulations, and the light source for each signal is then identified. The signals are thereafter processed to determine an azimuth and an elevation for the line-of-sight from the sensor to each light source. This azimuth and elevation information may then be used to determine the position and orientation of the object with respect to the six degrees of freedom.

In general, in one aspect, the invention is directed to an optical tracking system for tracking movement of an object within an enclosed area. The optical tracking system comprises, among other things, a plurality of light sources fixedly mounted at predefined locations along an interior of the enclosed area, each light source emitting light having a uniquely identifiable modulation frequency. The optical tracking system further comprises an optical sensor system fixedly mounted on the object, the optical sensor system configured to detect the light emitted from the plurality of light sources and determine an azimuth and an elevation of a line-of-sight from the optical sensor system to each light source based on the uniquely identifiable modulation frequency of each light source.

In general, in another aspect, the invention is directed an optical sensor system for tracking movement of an object within an enclosed area. The optical sensor system comprises, among other things, an optical sensor fixedly mounted on the object, the optical sensor configured to transform impinging light into an electrical signal. The optical system further comprises an analog-to-digital converter connected to the optical sensor and configured to digitize the electrical signal from the optical sensor. A signal processor is connected to the analog-to-digital converter and configured to determine an azimuth and an elevation of a line-of-sight from the optical sensor to a light source within the enclosed area based on the digitized signal from the analog to digital converter.

In general, in yet another aspect, the invention is directed a method of tracking movement of an object within an enclosed area in six degrees of freedom. The method comprises, among other things, the step of receiving light at an optical sensor system fixedly mounted on the object, the light being emitted from a plurality of light sources fixedly mounted at predefined locations along an interior of the enclosed area, each light source emitting light having a uniquely identifiable modulation frequency. The method further comprises the step of determining an azimuth and an elevation of a line-of-sight from the optical sensor system to each light source based on the uniquely identifiable modulation frequency of each light source.

BRIEF DESCRIPTION OF THE DRAWINGS

The foregoing and other advantages of the invention will become apparent from the following detailed description and upon reference to the drawings, wherein.

DETAILED DESCRIPTION OF EXEMPLARY EMBODIMENTS

The drawings described above and the written description of specific structures and functions below are not presented to limit the scope of what has been invented or the scope of the appended claims. Rather, the drawings and written description are provided to teach any person skilled in the art to make and use the inventions for which patent protection is sought. Those skilled in the art will appreciate that not all features of a commercial embodiment of the inventions are described or shown for the sake of clarity and understanding.

Persons of skill in this art will also appreciate that the development of an actual commercial embodiment incorporating aspects of the inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure.

It should be understood that the embodiments disclosed and taught herein are susceptible to numerous and various modifications and alternative forms. Thus, the use of a singular term, such as, but not limited to, "a" and the like, is not intended as limiting of the number of items. Also, the use of relational terms, such as, but not limited to, "top," "bottom," "left," "right," "upper," "lower," "down," "up," "side," and the like, are used in the written description for clarity in specific reference to the drawings and are not intended to limit the scope of the invention or the appended claims.

Particular embodiments are now described with reference to block diagrams and/or operational illustrations of methods. It should be understood that each block of the block diagrams and/or operational illustrations, and combinations of blocks in the block diagrams and/or operational illustrations, may be implemented by analog and/or digital hardware, and/or computer program instructions. Computing instructions for use with or by the embodiments disclosed herein may be written in an object oriented programming language, conventional procedural programming language, or lower-level code, such as assembly language and/or microcode. The instructions may be executed entirely on a single processor and/or across multiple processors, as a stand-alone software package or as part of another software package. Such computing instructions may be provided to a stand-alone processor, a general-purpose computer, special-purpose computer, ASIC, field-programmable gate array (FPGA), and/or other programmable data processing system.

The executed instructions may create structures and functions for implementing the actions specified in the mentioned block diagrams and/or operational illustrations. The functions/actions/structures noted in the drawings may also occur out of the order noted in the block diagrams and/or operational illustrations. For example, two operations shown as occurring in succession, in fact, may be executed substantially concurrently or the operations may be executed in the reverse order, depending on the functionality/acts/structure involved.

Figure 1:
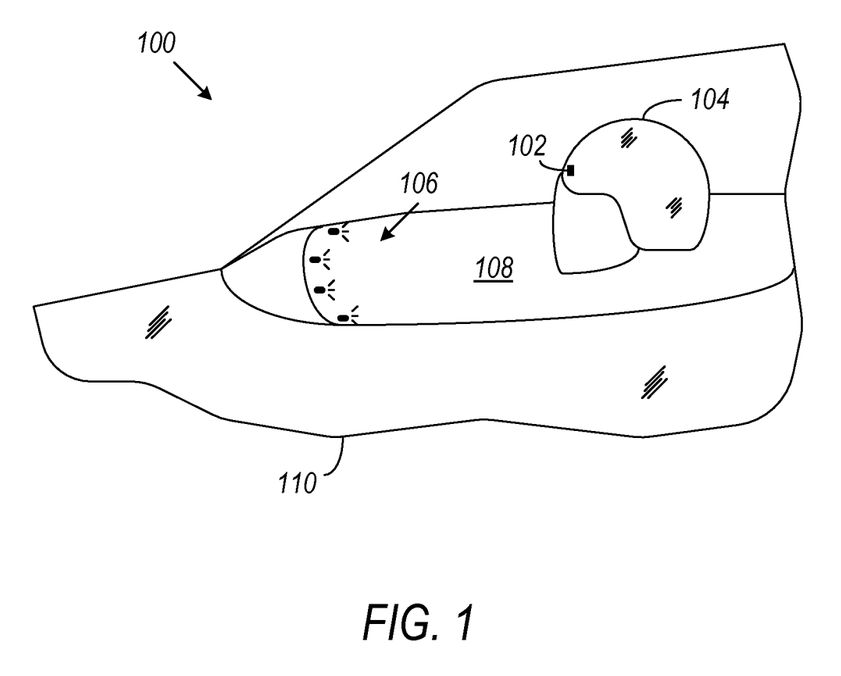
FIG. 1 illustrates an exemplary optical tracking system according to the disclosed embodiments.

Turning now to FIG. 1, an exemplary optical tracking system 100 is provided that is capable of tracking an object in six degrees of freedom, namely, X-axis, Y-axis, Z-axis, roll, pitch, and yaw, as those terms are commonly understood by those with ordinary skill in the art. The particular embodiment of the optical tracking system 100 shown in FIG. 1 has been adapted for use in an aviation application in order to track the movement of a pilot's helmet. Those having ordinary skill in the art, however, will understand that numerous other applications are possible, such as video game applications, virtual reality applications, automated assembly applications, medical applications, and the like. In general, the principles and teachings underpinning the optical tracking system 100 may be applied in any application where it is useful to track the movement of an object in an enclosed area.

As can be seen, the optical tracking system 100 comprises a number of components, including an optical sensor 102 that is attached to a pilot's helmet 104 (or other object), and a plurality of light sources 106 fixedly mounted in predefined locations around the interior of a cockpit 108 (or other enclosed area). The cockpit 108 is typically that of a military aircraft 110, such as a fighter jet or an attack helicopter, but civilian aircrafts and other types of vehicles may also benefit from the use of the optical tracking system 100. For military aircrafts in particular, the optical sensor 102 may be an infrared sensor and the light sources 106 may be infrared light sources to minimize any distraction to the pilot and also for stealth purposes.

Figure 2A:
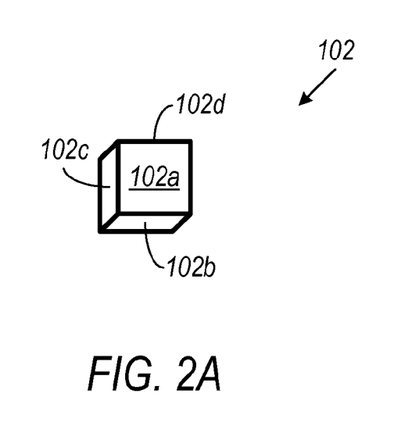
FIGS. 2A-2B illustrate an exemplary an optical sensor for an optical tracking system according to the disclosed embodiments.
Figure 2B:
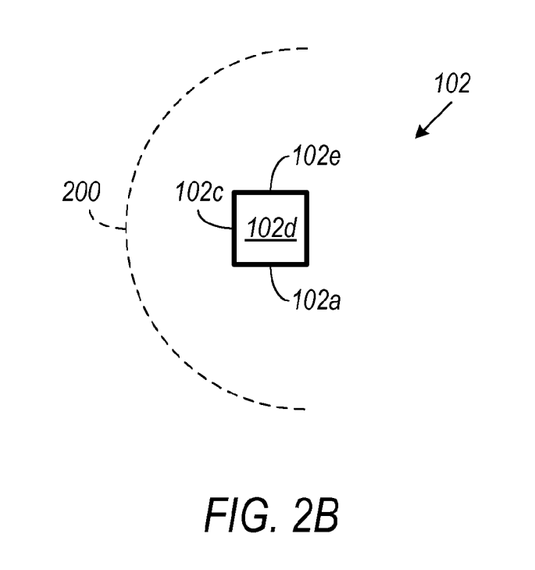

FIGS. 2A-2B, which are a perspective view and a top view, respectively, illustrate an exemplary implementation of the optical sensor 102 in more detail. As can be seen, in one embodiment, the optical sensor 102 may be composed of a number of individual light detectors arranged in close proximity to one another. The exact number of light detectors used may vary from three to five or more depending on the type of detectors, their arrangement in the optical sensor 102, and the field of view of each detector. In the example of FIGS. 2A-2B, there are five light detectors 102a, 102b, 102c, 102d, and 102e. Each light detector 102a-e is oriented at an angle (e.g., 70, 80, or 90 degrees) relative to adjacent light detectors 102a-e so that their fields of view, which is the angular area through which each detector may effectively detect light, overlap. Preferably, the individual fields of view, together with the degree of overlap, produces a hemispherical overall field of view for the optical sensor 102, as indicated generally by the dashed line 200. It is also possible, however, to provide the optical sensor 102 with a lesser or greater than hemispherical overall field of view.

Figure 3A:
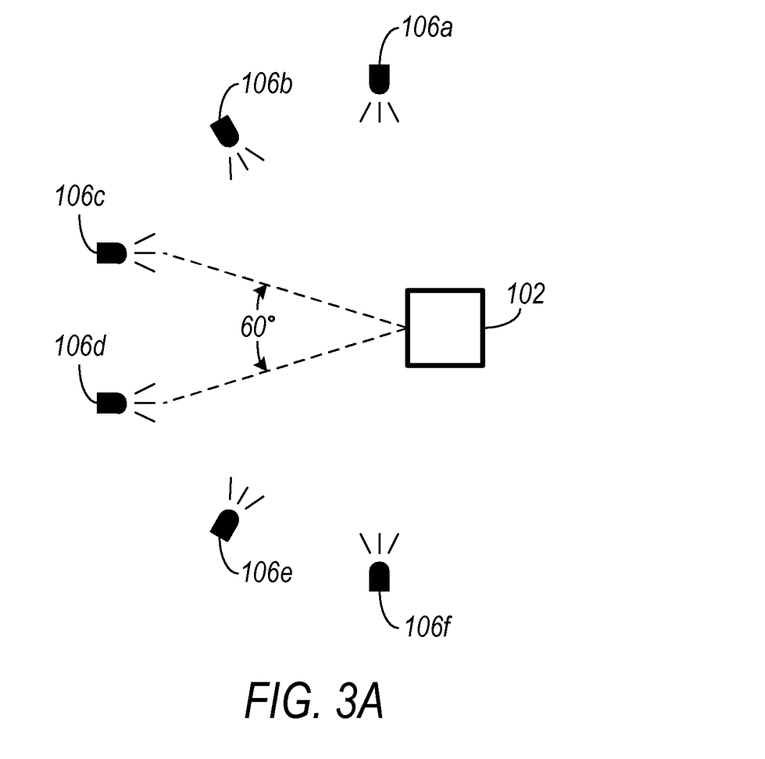
FIGS. 3A-3B illustrate an exemplary arrangement of light sources for an optical tracking system according to the disclosed embodiments.
Figure 3B:
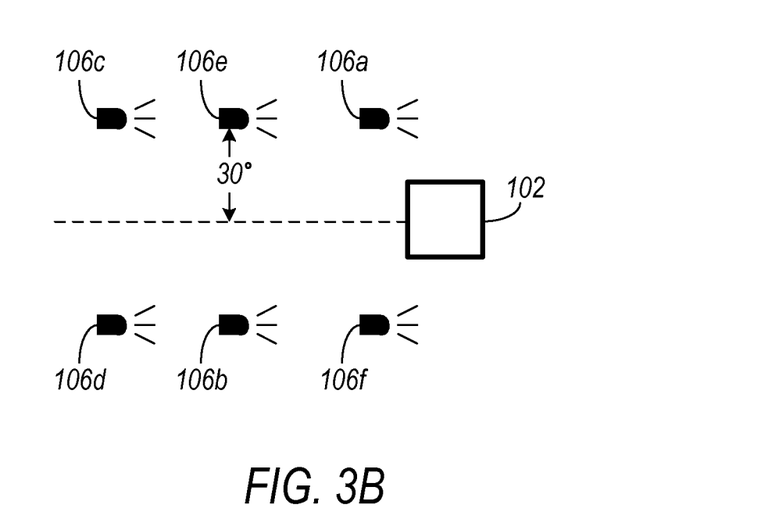

FIGS. 3A-3B, which are a top view and a side view, respectively, depict an exemplary implementation of the light sources 106 in more detail. As can be seen, there are a plurality of light sources 106 arranged about the optical sensor 102 in a predefined pattern. The exact number of light sources 106 may vary from one to six or more depending on the requirements of the particular application. In general, there should be a sufficient number of light sources 106 in the field of view of the optical sensor 102, and the optical sensor 102 should be able to determine the line-of-sight angles to each such light source 106, so as to provide adequate reference information for tracking the helmet 104 through its expected range of movement within the cockpit 108 (FIG. 1). For example, a single light source 106 within the field of view of the optical sensor 102 may be adequate for most military aviation applications if it is assumed that the helmet 104 remains fixed with respect to the X, Y, Z, and roll axes, such that only yaw (azimuth) and pitch (elevation) are tracked. On the other hand, it has been observed that at least three light sources 106 should be within the field of view of the optical sensor 102 for most military aviation applications in order to allow tracking of the helmet 104 in all six degrees of freedom (i.e., X, Y, Z, roll, pitch, and yaw).

Accordingly, to help ensure that at least three light sources 106 are within the field of view of the optical sensor 102 at all times, six light sources 106a, 106b, 106c, 106d, 106e, and 106f are provided in the embodiment of FIGS. 3A-3B. These light sources 106a-f may be positioned throughout the cockpit 108 approximately 1-2 meters from the pilot's helmet 104 (and the optical sensor 102 therein), depending on the power rating of the light sources 106a-f. In addition, to help ensure sufficient yaw (azimuth) coverage, the light sources 106a-f may be distributed at an average angular spacing of about 60 degrees around the optical sensor 102, as shown in FIG. 3A. Furthermore, to help ensure sufficient pitch (elevation) coverage, the light sources 106a-f may also be distributed with alternate ones of the light sources 106a-f about 30 degrees on average above and below a horizontal of the optical sensor 102, as shown in FIG. 3B.

In some instances, the light from one of the three light sources 106a-f may be blocked or otherwise obscured from the optical sensor 102, for example, by a crewmember's hand or arm movement. When this happens, it may still be possible to determine the position and orientation of the pilot's helmet 104 based on line-of-sight information from the two remaining light sources 106a-f. For example, in some embodiments, it may be useful during the obscuration to assume that the position of the pilot's helmet 104 along the X, Y, and Z axes did not change, which would then allow the orientation of the helmet 104 to be determined.

Of course, other configurations, elevations, and angular spacing besides those discussed above may be employed by persons having ordinary skill in the art, depending on the size and shape of the field of view of the optical sensor 102, without departing from the scope of the disclosed embodiments.

In general operation, light from each light source 106a-f is modulated with a different modulation frequency from the other light sources 106a-f using any suitable modulation technique known to those having ordinary skill in the art. When the modulated light impinges the optical sensor 102, it is detected by each light detector 102a-e for which the light enters a field of view. The impinging light is then transformed by each light detector 102a-e (for which the light enters a field of view) into an electrical signal. Due to the finite size of the optical sensor 102 and the relatively limited distance between the optical sensor 102 and the light sources 106a-f, the amount of light impinging on the optical sensor 102 from a given light source 106a-f will change perceptibly with distance, resulting in an electrical signal having an amplitude that varies according to the distance between the optical sensor 102 and each light source 106a-f. The electrical signal from each light detector 102a-e may then be amplified, converted, and otherwise processed to determine the line-of-sight from the optical sensor 102 to each light source 106a-f.

Figure 4:
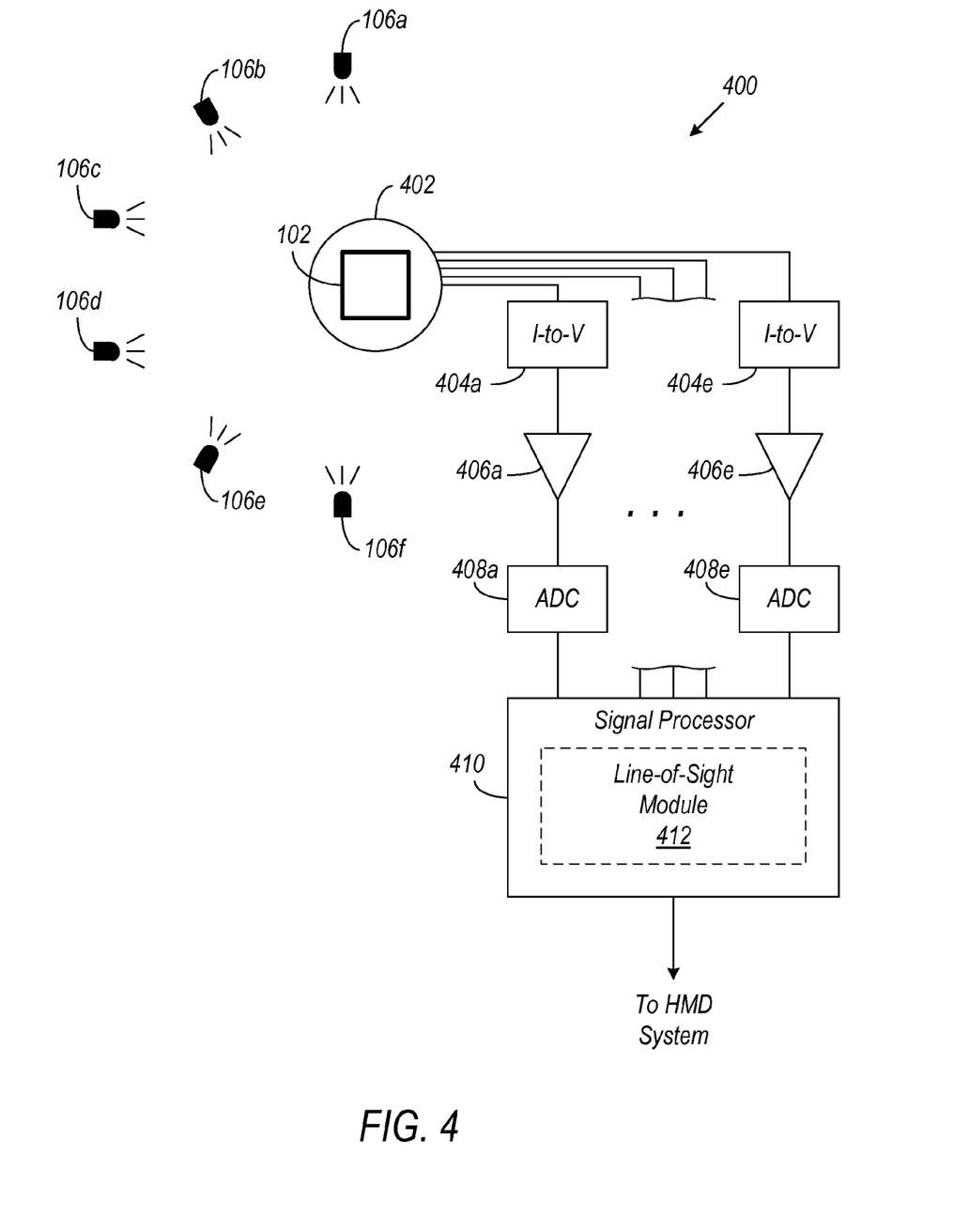
FIG. 4 illustrates an exemplary optical sensor system for an optical tracking system according to the disclosed embodiments.

FIG. 4 illustrates an exemplary optical sensor system 400 that may be used to amplify, convert, and otherwise process signals from the light detectors 102a-e. As can be seen, the optical sensor system 400 may comprise a number of electrical and/or functional components connected to one another in the manner shown. These components are described further below.

In some embodiments, the components of the optical sensor system 400 may include an optical filter 402a covering the optical sensor 102, or at least the field of view of the optical sensor 102. The optical filter 402 operates to filter out light, such as sunlight and the like, that may interfere with the ability of the light detectors 102a-e to detect the light from the light sources 106a-f.

In addition, the optical sensor system 400 may also include pre-amplifiers 404a-e for providing pre-amplification of the electrical signal from the optical sensor 102. In some embodiments, the preamplifiers 404a-e may be transimpedance amplifiers that are capable of converting the electrical signals outputted by the light detectors 102a-e from electrical current to voltage. Preferably, each light detector 102a-e is provided with its own transimpedance amplifier 404a-e for a total of five transimpedance amplifiers in the embodiment shown in FIG. 4.

Operational amplifiers 406a-e may also be provided, one for each light detector 102a-e in some embodiments, as depicted in the figure, in order to boost the strength of the signal from each light detector 102a-e to a more desirable or reliable level.

Analog-to-digital converters 408a-e, one for each light detector 102a-e, may be provided to convert the signals from the light detectors 102a-e from analog to digital signals. The digitized signals from the analog-to-digital converters 408a-e may then be sent to a signal processor 410 for processing. Such a signal processor 410 may be programmed with, or may otherwise store, a line-of-sight module 410 (or the programming equivalent thereof) that is configured to determine the line-of-sight angles from the optical sensor 102 to each light source 106a-f.

And although not expressly shown, a mechanical housing may also be provided in some embodiments to help protect the optical sensor 102 and the various electronic components of the optical sensor system 400 from physical interference.

The foregoing components of the optical sensor system 400 are well known to those having ordinary skill in the art and are therefore not described in detail here. Suffice it to say, these components may be standard, commercially available components obtainable from a number of electronic parts manufacturer. Preferably, all components are housed within a sufficiently small package and highly integrated such that the entire optical sensor system 400 (i.e., five pre-amplifiers, five operational amplifiers, five analog-to-digital converters, and a signal processor), or a significant portion thereof, may be mounted on a 1-inch or smaller diameter printed circuit board, which may be a double-sided printed circuit board in some cases.

In one implementation, the analog-to-digital converters 40a-e may be 10-bit, 1 MSPS (million samples per second), serial output analog-to-digital converters, and the signal processor 410 may be one of several models of the Spartan-3® family of field-programmable gate arrays (FPGA) available from Xilinx, Inc.

In addition, each light source 106a-f may be, for example, a 50-milliwatt infrared light-emitting diode (LED) having a frequency that does not interfere with the operation of night vision goggles, which typically operate at a wavelength of 1100 nanometers or less. Each light detector 102*a-e* may be, for example, an InGaAs light detector having a responsivity of 0.85 amps/watt and a cutoff wavelength greater than 1700 nanometers. Assuming the optical filter 402 has a cutoff wavelength of 1400 nanometers, the line-of-sight angle noise is expected to be approximately 1.5 milliradians under normal sun-lit background light, and 2.6 milliradians under 100%, full-on sunlight impinging the optical sensor 102. The latter case noise of 2.6 milliradians equates to about half of the allowed line-of-sight angle noise, which is about 5 milliradians for the optical tracking system 100.

Other characteristics of the optical tracking system 100 may include an allowable tracking error of approximately 5-8 milliradians and an allowable tracking latency of approximately 15-20 milliseconds, where latency is defined as the delay between a helmet movement and a 95% response of the signal processing to that movement (which equates to three first-order system response time constants). Still other characteristics of the optical tracking system 100 may include an allowable movement of the helmet 104 of approximately ±90 degrees for azimuth, approximately +25 to −60 degrees for elevation, approximately ±30 degrees for roll, approximately 400 millimeters for the X-axis, approximately 300 millimeters for the Y-axis, and approximately 400 millimeters for the Z-axis.

Figure 5:
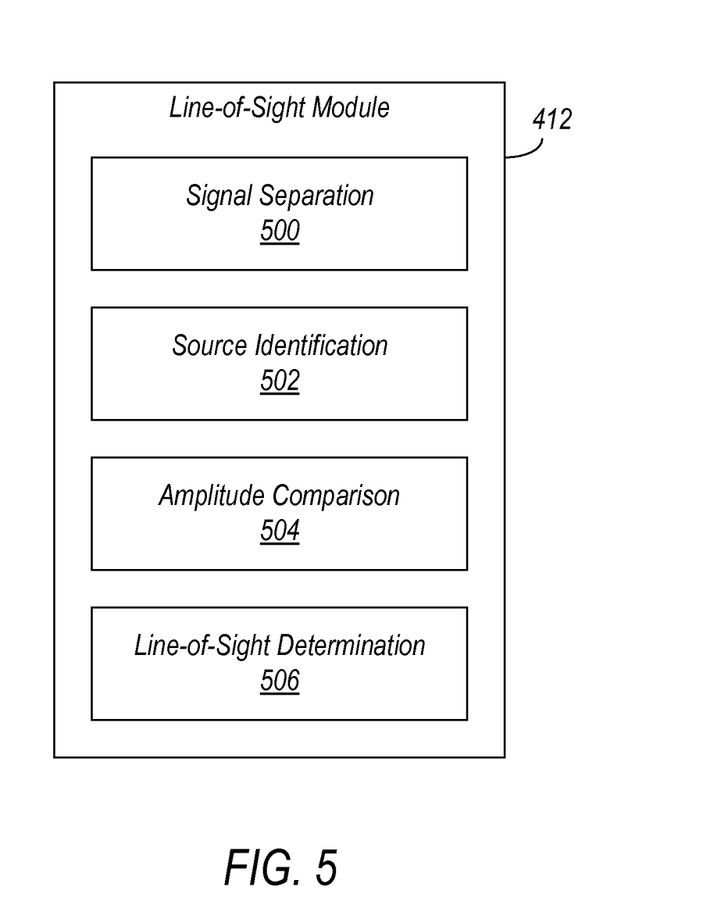
FIG. 5 illustrates an exemplary signal processing module for an optical tracking system according to the disclosed embodiments.

Referring now to FIG. 5, an exemplary implementation of the line-of-sight module 412 operating on the signal processor 410 is depicted in more detail. As foreshadowed above, the line-of-sight module 412 is generally responsible for separating the composite signal received from each light detector 102*a-e* into their constituent signals and identifying the source of each signal. For each light source 106*a-f*, the line-of-sight module 412 determines which light detector 102*a-e* produced the highest amplitude signal from that light source 106*a-f*, normalizes the signal amplitudes from that light source 106*a-f* at the remaining light detectors 102*a-e*, and determines an azimuth and elevation of the line-of-sight to that light source 106*a-f* using the normalized amplitudes. Multiple measurements or readings of such azimuth and elevation information may be taken at a certain predefined frequency, including a baseline or reference set of azimuth and elevation and subsequent or additional sets. The azimuth and elevation information may then be provided to an appropriate application, such as an HMD system, for use in calculating the position and orientation of the pilot's helmet 104.

In accordance with embodiments of the invention, the line-of-sight module 412 may comprise a number of functional blocks, including a signal separation block 500, a source identification block 502, an amplitude comparison block 504, and a line-of-sight determination block 506. Although shown as discrete blocks, those having ordinary skill in the art will understand that any two or more of the functional blocks 500-506 may be combined into a single block, or any individual block 500-506 may be divided into multiple constituent blocks. Furthermore, one or more blocks 500-506 may be removed from or other functional blocks may be added to the line-of-sight module 412 without departing from the disclosed embodiments. Each of the functional blocks 500-506 is described further below.

The signal separation block 500 is generally responsible for separating the composite signal outputted from each light detector 102*a-e* into their constituent signals based on each signal's unique frequency modulation. In some embodiments, this may be done by a technique commonly used in radio receivers called superheterodyne, in which a signal of a particular frequency may be isolated from signals having differing frequencies. The superheterodyne technique involves "mixing" the composite signal from each light detector 102*a-e* with a local signal having the frequency that is to be detected. The signal separation block 500 performs this mixing by causing a digitized version of the composite signal to be multiplied with a digital version of the local signal having the desired frequency, and also with another digital signal having the same frequency, but phase shifted by 90 degrees. The results of the mixing are summed together, filtered, and the square root extracted, leaving a signal that is proportional to the amplitude of the modulated signal. By varying the frequency of the local signal, each one of modulated signals may be extracted from the composite signal for each light detector 102*a-e*.

The source identification block 502 generally operates to associate each extracted modulated signal with its corresponding light source 106*a-f*. This may be accomplished, for example, using a simple lookup table to see which light source 106*a-f* was assigned which unique modulation frequency.

The amplitude comparison module 504 is generally responsible for determining which light detector 102*a-e* produced the highest amplitude signal for each extracted modulated signal. The amplitudes for that signal at the remaining light detectors 102*a-e* are then divided by the highest amplitude in order to normalize the signal. Thus, for example, assuming the first light detector 102*a* produced the highest amplitude signal from the first light source 106*a*, then the amplitude of that same signal at the second light detector 102*b* is divided by the amplitude of the signal at the first light detector 102*a*, and so on.

The resulting normalized signals for each light source 106*a-f* received by the optical sensor 102 may then be used by the line-of-sight determination block 506 to determine an azimuth and an elevation for the line-of-sight from the optical sensor 102 to that light source 106*a-f*. In some embodiments, such azimuth and elevation determinations may be accomplished using methods known to those having ordinary skill in the art. An example of a method that may be used for determining line-of-sight azimuth and elevation is described in U.S. Pat. No. 6,690,458, entitled "Methods and Apparatuses for Reconstructing Angle Information," which is assigned to the present assignee and hereby incorporated by reference in its entirety. Note that light from every light source 106*a-f* may not necessarily be received by the optical sensor 102, depending on the position of the light detectors 102*a-e* at the time a reading is taken by the line-of-sight module 412. As mentioned above, however, preferably the light sources 106*a-f* are arranged about the optical sensor 102 such that light from at least three light sources 106*a-f* impinges on the optical sensor 102 at any given time.

Figure 6:
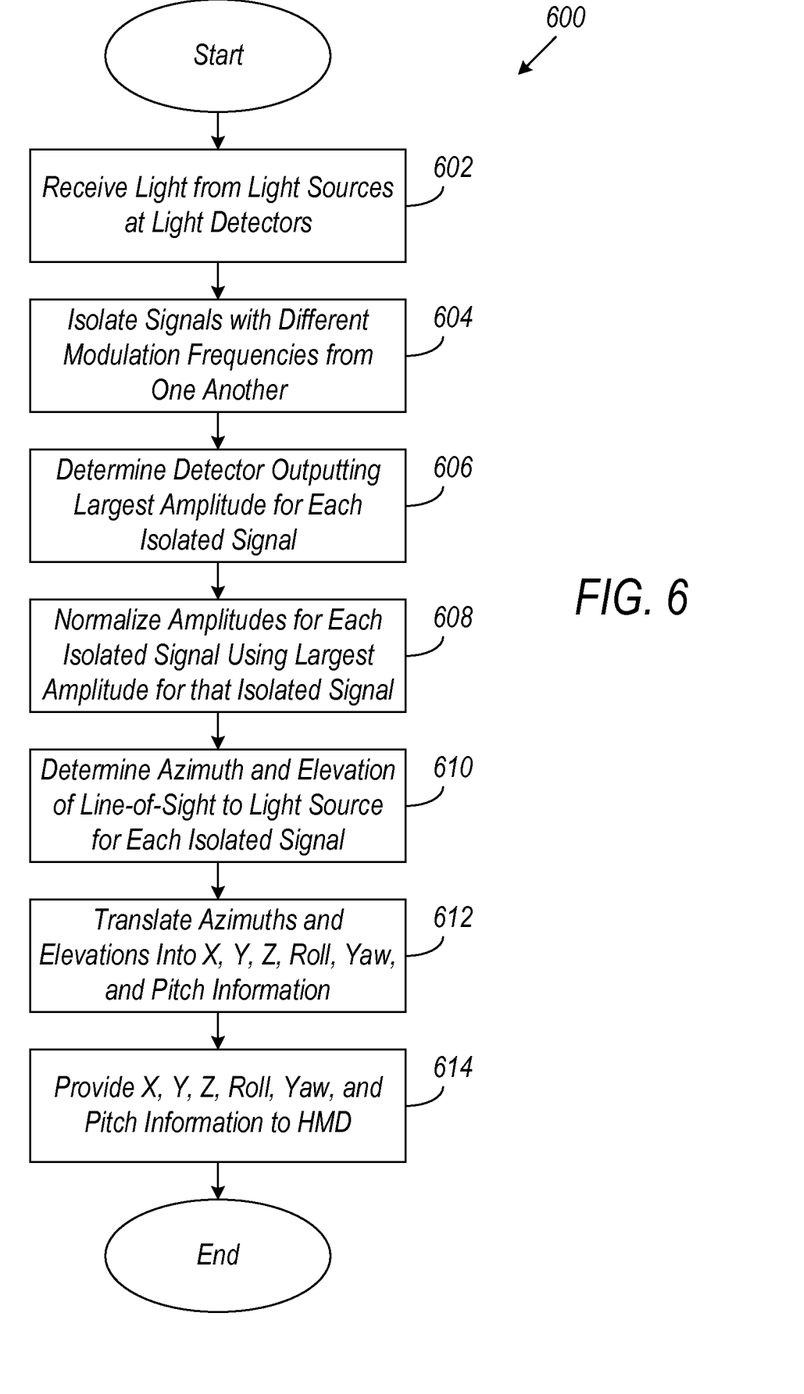
FIG. 6 illustrates an exemplary method for an optical tracking system according to the disclosed embodiments.

Thus far, implementation-specific details have been provided for various embodiments of the invention. Illustrated now in FIG. 6 are general guidelines that may be used for tracking an object, such as a pilot's helmet, in six degrees of freedom according to the disclosed embodiments. As can be seen in FIG. 6, a flowchart 600 illustrating the exemplary tracking method of the invention generally begins at step 602, where signals from a plurality of light sources fixedly mounted about an enclosed area, such as a cockpit, are detected by light detectors attached to the object. At step 604, signals from the various light sources are separated or otherwise isolated from one another based on each light source's unique modulation frequency. Such separation may be accomplished using, for example, superheterodyne techniques known to those having ordinary skill in the art.

At step 606, the largest amplitude signal detected by the various light detectors for each light source is determined, and this amplitude is subsequently used to normalize that same signal for all light detectors at step 608 (e.g., by dividing the other amplitudes by the largest amplitude). At step 610, the normalized signals are used to determine an azimuth and an elevation for the line-of-sight from each light detector to each light source, again, using techniques known to those of ordinary skill in the art. At step 612, the azimuth and elevation are translated into X, Y, Z, roll, yaw, and pitch information using commonly known three dimensional vector processing techniques. Finally, at step 614, the X, Y, Z, roll, yaw, and pitch information may be provided to any application using such information, such as the HMD system.

While the disclosed embodiments have been described with reference to one or more particular implementations, those skilled in the art will recognize that many changes may be made thereto. For example, in some embodiments, instead of having a single optical sensor 102 receive light from the light sources 106, it is also possible to use multiple optical sensors 102 to receive the light from the light sources 106, owing to each light source 106 having a uniquely identifiable modulation frequency. In addition, in some embodiments, instead of using one LED for each light source 106, multiple LEDs may be clustered together as a single light source 106, with each LED cluster sharing a common modulation frequency that is different from other LED clusters. Therefore, each of the foregoing embodiments and obvious variations thereof is contemplated as falling within the spirit and scope of the disclosed embodiments, which are set forth in the following claims.

What is claimed is:

1. An optical sensor system for tracking movement of an object within an enclosed area, the optical sensor system comprising:
    an optical sensor fixedly mounted on the object, the optical sensor configured to transform impinging light into an electrical signal;
    an analog-to-digital converter connected to the optical sensor and configured to digitize the electrical signal from the optical sensor; and
    a signal processor connected to the analog-to-digital converter and configured to determine an azimuth and an elevation of a line-of-sight from the optical sensor to a light source within the enclosed area based on the digitized signal from the analog to digital converter;
    wherein the optical sensor includes a plurality of light detectors, one or more of the light detectors being oriented at an angle relative to at least one adjacent light detector; and
    wherein the signal processor determines the azimuth and the elevation of the line-of-sight to the light source by separating the digitized signal into a plurality of individual signals, each one of the plurality of individual signals being identifiable according to its modulation frequency, each modulation frequency corresponding to a different light source, and normalizing all signal amplitudes corresponding to each light source.

2. The system according to claim 1, wherein the enclosed area is a fighter jet cockpit and the object is a fighter pilot's helmet.

3. The system according to claim 1, further comprising one or more of the following:
    an optical filter for preventing certain types of light from impinging the optical sensor;
    a transimpedance amplifier for converting the electrical signal from the optical sensor from a current to a voltage; and
    an operational amplifier for boosting a signal strength of the electrical signal from the optical sensor.

4. The system according to claim 1, wherein the optical sensor includes a plurality of light detectors, one or more of the light detectors being oriented at an angle relative to at least one adjacent light detector.

5. The system according to claim 4, wherein the plurality of light detectors includes a sufficient number of light detectors to provide the optical sensor with a substantially hemispherical overall field of view.

6. The system according to claim 4, wherein the plurality of light detectors includes from three to five light detectors.

7. A method of tracking movement of an object within an enclosed area in six degrees of freedom, the method comprising:
    receiving light at an optical sensor system fixedly mounted on the object, the light being emitted from a plurality of light sources fixedly mounted at predefined locations along an interior of the enclosed area, each light source emitting light having a uniquely identifiable modulation frequency;
    determining an azimuth and an elevation of a line-of-sight from the optical sensor system to each light source based on the uniquely identifiable modulation frequency of each light source,
    separating the electrical signal into a plurality of individual signals, each one of the plurality of individual signals being identifiable according to its modulation frequency, each modulation frequency corresponding to a different one of the plurality of light sources; and
    determining which light detector produced the largest amplitude signal for each light source and normalizing all signal amplitudes corresponding to each light source using the largest amplitude signal.

8. The method according to claim 7, wherein the enclosed area is an airplane cockpit and the object is a pilot's helmet.

9. The method according to claim 7, wherein the optical sensor system includes a plurality of light detectors placed in close proximity to one another, each light detector converting the light from the plurality of light sources into an electrical signal.

10. The method according to claim 9, further comprising separating the electrical signal into a plurality of individual signals, each one of the plurality of individual signals being identifiable according to its modulation frequency, each modulation frequency corresponding to a different one of the plurality of light sources.

11. The method according to claim 7, further comprising translating the azimuth and the elevation of the line-of-sight for the plurality of light sources into X-axis, Y-axis, Z-axis, roll, yaw, and pitch information for the object.

* * * * *